United States Patent
Pietraski

(10) Patent No.: US 7,974,365 B2
(45) Date of Patent: Jul. 5, 2011

(54) METHOD AND APPARATUS FOR COMPUTING SIR OF TIME VARYING SIGNALS IN A WIRELESS COMMUNICATION SYSTEM

(75) Inventor: Philip J. Pietraski, Huntington Station, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 148 days.

(21) Appl. No.: 12/535,018

(22) Filed: Aug. 4, 2009

(65) Prior Publication Data

US 2009/0290617 A1    Nov. 26, 2009

Related U.S. Application Data

(63) Continuation of application No. 12/191,533, filed on Aug. 14, 2008, now Pat. No. 7,590,192, which is a continuation of application No. 11/302,819, filed on Dec. 14, 2005, now Pat. No. 7,421,045.

(60) Provisional application No. 60/663,321, filed on Mar. 18, 2005.

(51) Int. Cl.
*H03K 9/00*        (2006.01)
*H04L 27/00*       (2006.01)

(52) U.S. Cl. ........................................ 375/316; 375/345

(58) Field of Classification Search .................. 375/316, 375/345
See application file for complete search history.

(56) References Cited

U.S. PATENT DOCUMENTS

| | | | |
|---|---|---|---|
| 6,028,894 | A | 2/2000 | Oishi et al. |
| 6,032,026 | A | 2/2000 | Seki et al. |
| 6,034,952 | A | 3/2000 | Dohi et al. |
| 6,823,193 | B1 | 11/2004 | Persson et al. |
| 6,967,998 | B1 | 11/2005 | Chen et al. |
| 7,328,019 | B2 | 2/2008 | Nishikawa et al. |
| 2002/0196879 | A1 | 12/2002 | Iochi |
| 2003/0185179 | A1 | 10/2003 | Inogai et al. |
| 2004/0093178 | A1 | 5/2004 | Shin et al. |
| 2004/0116142 | A1 | 6/2004 | Wang et al. |
| 2004/0228272 | A1 | 11/2004 | Hasegawa et al. |
| 2004/0264591 | A1 | 12/2004 | Malm et al. |
| 2005/0036538 | A1 * | 2/2005 | Niederholz et al. .......... 375/148 |
| 2005/0272373 | A1 | 12/2005 | Murase |
| 2007/0207741 | A1 | 9/2007 | Jones |

FOREIGN PATENT DOCUMENTS

| | | |
|---|---|---|
| JP | 2005-012386 | 1/2005 |
| WO | 01/65717 | 9/2001 |

* cited by examiner

*Primary Examiner* — Curtis B Odom
(74) *Attorney, Agent, or Firm* — Volpe And Koenig, P.C.

(57) ABSTRACT

A method and apparatus for correcting symbols of a common pilot channel (CPICH) to generate an accurate signal-to-interference ratio (SIR) estimate in a wireless communication system are disclosed. In one embodiment, a non-stationary mean of a group of the CPICH symbols is estimated, the CPICH symbols are delayed, and the CPICH symbols are corrected by dividing the delayed CPICH symbols by the estimated non-stationary mean of the group of CPICH symbols. In another embodiment, a signal power estimate is generated based on the magnitude of CPICH symbols, a noise power estimate is generated by subtracting the signal power estimate from a total power estimate based on the magnitude of the CPICH symbols, and a SIR estimate is generated for symbols that have undergone a time varying gain by dividing the signal power estimate by the noise power estimate.

10 Claims, 4 Drawing Sheets

METHOD AND APPARATUS FOR COMPUTING SIR OF TIME VARYING SIGNALS IN A WIRELESS COMMUNICATION SYSTEM

CROSS REFERENCE TO RELATED APPLICATION

This application is a continuation of U.S. patent application Ser. No. 12/191,533, filed Aug. 14, 2008, which is a continuation of U.S. patent application Ser. No. 11/302,819, filed Dec. 14,2005, which issued as U.S. Pat. No. 7,421,045 on Sep. 2, 2008, which claims the benefit of U.S. Provisional Patent Application No. 60/663,321, filed Mar. 18, 2005, which are incorporated by reference as if fully set forth.

FIELD OF INVENTION

This application is related to wireless communications.

BACKGROUND

Advanced wireless communication systems, such as third generation (3G) high speed downlink packet access (HSPDA) systems, often transmit a common pilot channel (CPICH) signal that is used to estimate the quality of a communication channel. One of the typical methods that are used to estimate channel quality includes estimating the SIR of a pilot signal. In packet based systems, the received power level may change often as packets are transmitted at different power levels. An automatic gain control (AGC) circuit is used at a receiver in a wireless transmit/receive unit (WTRU) (i.e., a mobile station) to react to the changes in the power level by adjusting the gain.

In a conventional wireless communication system which generates a pilot signal, time varying gain changes occur on the pilot signal. Thus, the pilot signal becomes non-stationary which results in making it more difficult to estimate the true SIR of the signal. Typically, the true SIR will be underestimated. When the measured SIR is lower than the actual SIR is indicated to the system that the channel quality is worse than it actually is, thus leading to lower throughput and inefficient use of radio resources.

When a 3G HSDPA system has large total transmit (Tx) power variations, as is possible when some subframes carry packets while other subframes do not, the AGC circuit will adapt to the new power level at a rate that depends on implementation of the AGC circuit, while the transmitted pilot power has not changed. Therefore, the pilot symbols which are computed by despreading pilot chips will have mean values and variances that change with time, causing the AGC gain to change. This distorts the accuracy of the SIR computation, as shown in FIG. 1. Because the gain varies during the SIR measurement period, the SIR estimate is often inaccurate when compared to true SIR.

SUMMARY

The present invention is related to a method and apparatus for correcting symbols of a CPICH to generate an accurate SIR estimate in a wireless communication system. In one embodiment, a non-stationary mean of a group of the CPICH symbols is estimated, the CPICH symbols are delayed, and the CPICH symbols are corrected by dividing the delayed CPICH symbols by the estimated non-stationary mean of the group of CPICH symbols. In another embodiment, a signal power estimate is generated based on the magnitude of CPICH symbols, a noise power estimate is generated by subtracting the signal power estimate from a total power estimate based on the magnitude of the CPICH symbols, and a SIR estimate is generated for symbols that have undergone a time varying gain by dividing the signal power estimate by the noise power estimate.

BRIEF DESCRIPTION OF THE DRAWINGS

A more detailed understanding of the invention may be had from the following description of a preferred embodiment, given by way of example and to be understood in conjunction with the accompanying drawing wherein.

DETAILED DESCRIPTION

The present invention provides more accurate SIR computations of signals that have time varying statistics due to application of a time varying gain, i.e., are non-stationary. The channel quality is computed more accurately and thereby increases the system and WTRU throughput. The method of the invention estimates the effect of AGC or other adaptive components on the symbols. The estimated effect of such components on the symbols is taken into account when the SIR is calculated, thus resulting in a more accurate estimate of the SIR.

The features of the present invention may be incorporated into an integrated circuit (IC) or be configured in a circuit comprising a multitude of interconnecting components.

Figure 2:
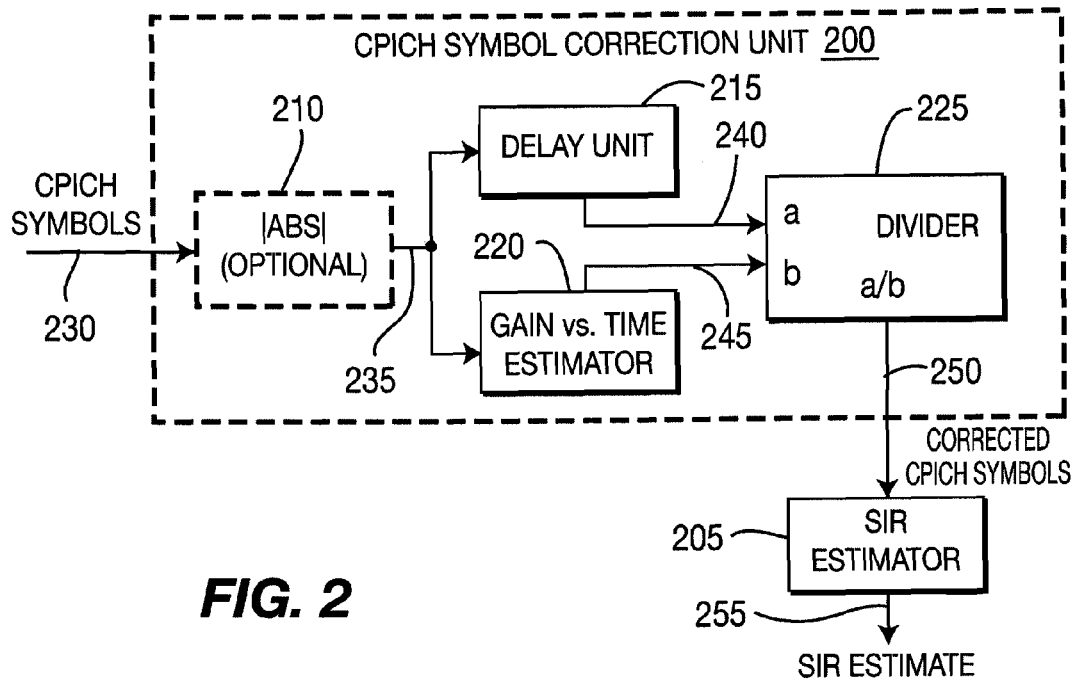
FIG. 2 is a block diagram of an apparatus including a CPICH symbol correction unit for correcting CPICH symbols prior to performing a SIR estimate in accordance with the present invention.

In accordance with the present invention, the symbols may first be corrected in order to compute the SIR or alternatively the correction can be incorporated into the SIR algorithm. In a preferred embodiment, the method of the invention performs SIR measurements by removing the effects of the time varying gain. FIG. 2 shows a top-level diagram that illustrates the performing of the SIR measurements by removing the effects of the gain variations. The CPICH symbol amplitudes are collected, and a time history of the symbols is used to estimate the gain variations during that history. The estimated gain history (gain versus time estimate) is used to correct the corresponding symbols and therefore the symbol amplitudes. Once corrected, the symbols may be processed with conventional SIR algorithms.

FIG. 2 is a block diagram of an apparatus including a CPICH symbol correction unit 200 for correcting CPICH symbols prior to performing a SIR estimate using a SIR estimator 205 in accordance with the present invention. The CPICH symbol correction unit includes an optional magnitude unit 210, a delay unit 215, a gain versus time estimator 220 and a divider 225.

Referring to FIG. 2, it is assumed that the CPICH symbols 230 are despread CPICH symbols 230. However, it should be understood by one of ordinary skill in the art that the input to the CPICH symbol correction unit 200 may be any other type of phase modulated symbols. The magnitude unit 210 is optional and is useful for reducing complexity of the CPICH symbol correction unit 200. Each CPICH symbol 230 is a complex number. The output of the magnitude unit 210 is the magnitude of the input complex numbers associated with the CPICH symbols 230, referred to hereinafter as the CPICH magnitude signal 235. Thus, the CPICH magnitude signal 235 is equal to the magnitude of the CPICH symbols 230. Since changing the phase of a complex number does not alter its magnitude, phase noise and phase modulation do not impact the SIR estimation if the magnitude unit 210 is used. The magnitude unit 210 may also be used to suppress the impact of phase noise on a SIR estimate 255 generated by the SIR estimator 205. The CPICH magnitude signal 235 is fed to both the delay unit 215 and the gain versus time estimator 220.

Figure 1:
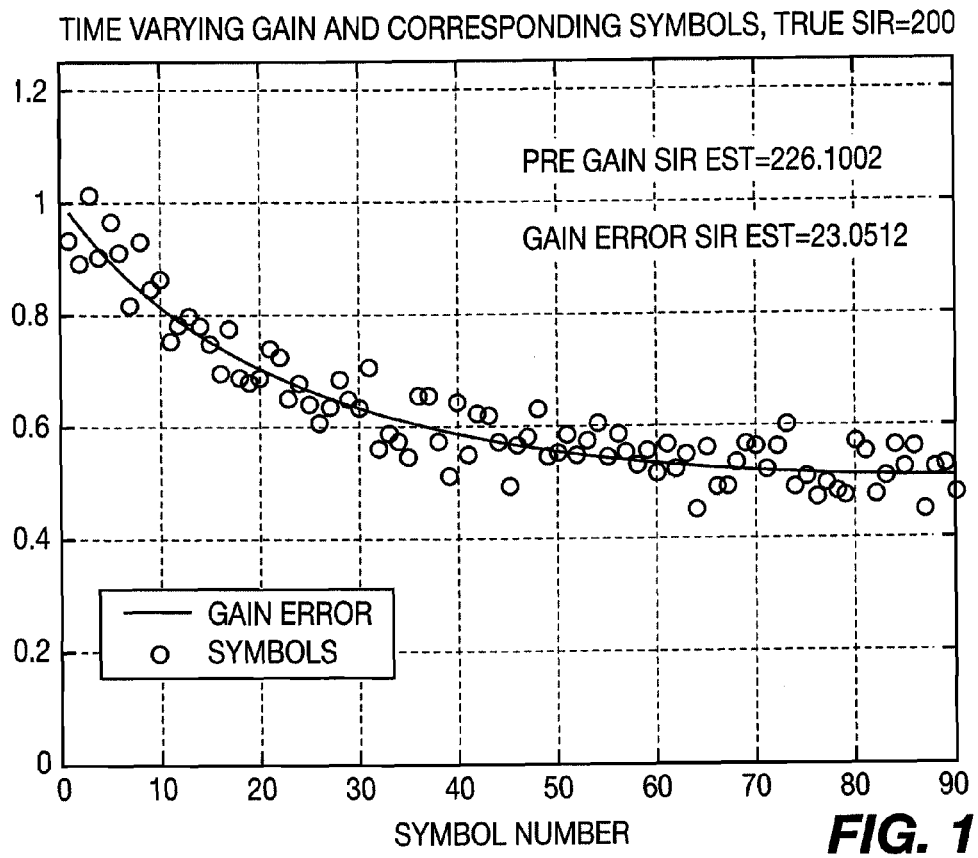
FIG. 1 shows an example of CPICH symbol amplitudes after a discontinuous power level change due to AGC in a conventional wireless communication system.

The gain versus time estimator 220 estimates the non-stationary, or time-varying, mean of a group of symbols included in the signal 235, as shown in FIG. 1, where the input symbols of signal 235 are represented by the open circles and the non-stationary time-varying gain that the input symbols are subjected to is represented by a solid line. The gain versus time estimator 220 outputs a signal 245, which is an estimate of the non-stationary time-varying gain shown in FIG. 1. The delay unit 215 generates an output 240 which is a delayed version of the signal 235. The delay unit 215 is used so that the gain versus time estimator 220 has sufficient time to collect a set of symbols from the signal 235, estimate the non-stationary mean of the symbols, and generate the signal 245 such that it is time-aligned with the signal 240. Since it takes some time to compute the time-varying mean of the CPICH symbols 230, and it is desired to divide each symbol by its mean, the symbols are delayed such that when symbol X is on the output 240 of the delay unit 215, the estimated mean of symbol X is also on the output 245 of the gain versus time estimator 220. The divider 225 divides each symbol on output 240 by an estimate of its mean on output 245, thereby removing the gain error and providing corrected symbols on output 250. The corrected symbols can then be used as the input to the SIR estimator 205 under the assumption that the symbols are stationary, which indicates that the statistics of the symbols, e.g., the mean, do not change with time. By dividing each symbol by its mean, set of symbols is created that have the same mean, thus effectively removing the time varying gain. Therefore, the SIR estimate 255 generated by the SIR estimator 205 more accurately measures the true SIR of the despread CPICH symbols 230.

Any number of curve-fitting filtering methods may be used, as is known to one of ordinary skill in the art. In accordance with the present invention, a preferred curve-fitting filtering method using piece-wise linear estimation on each group of symbols may be implemented by the gain versus time estimator 220, thereby creating a linear curve segment for each group. The straight line segments shown in FIG. 4 illustrate the piece-wise linear curve generated by the gain versus time estimator 220.

Figure 3:
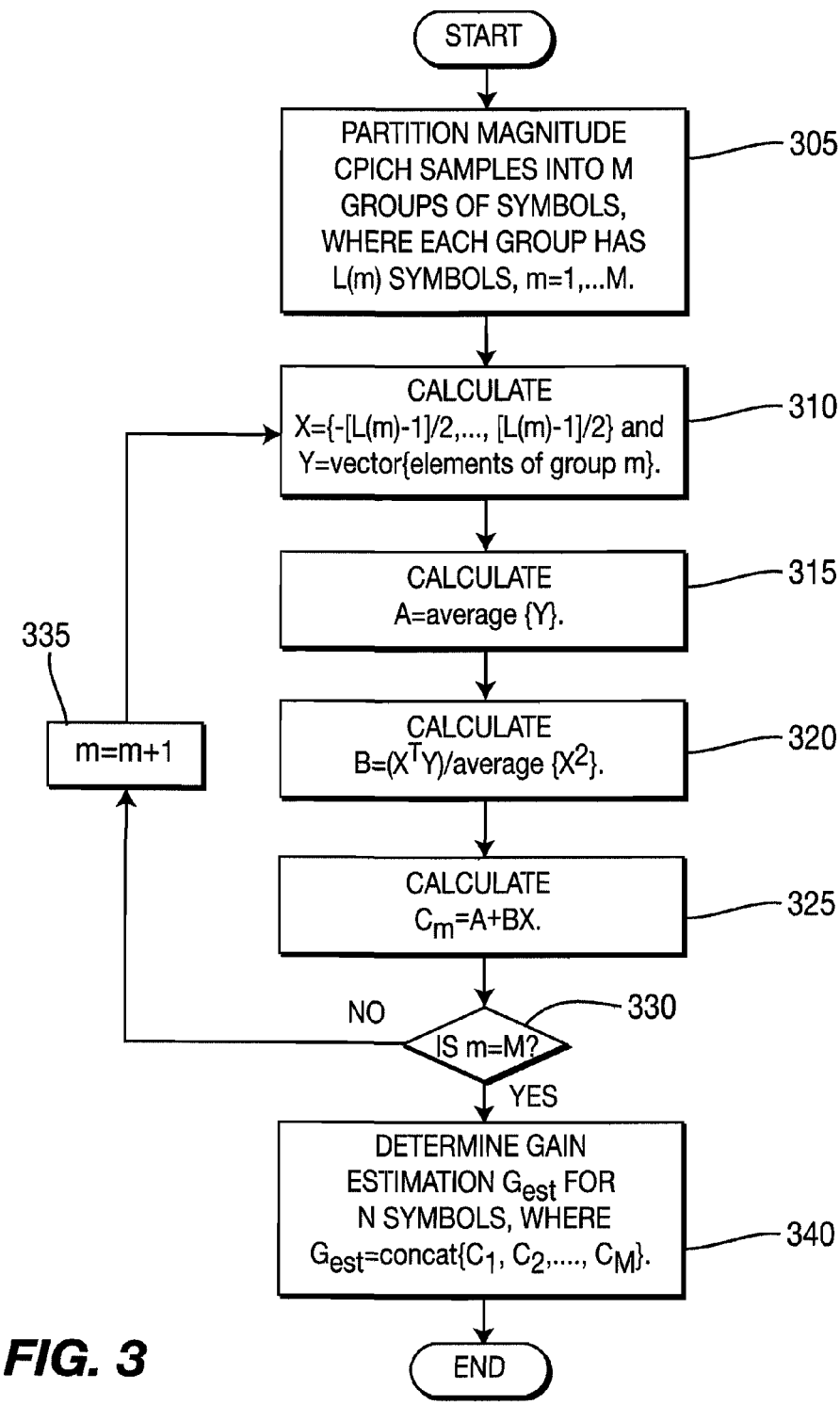
FIG. 3 is a flow diagram of a piece-wise linear curve fitting process performed by a gain versus time estimator in the CPICH symbol correction unit of FIG. 2.

FIG. 3 is a flow diagram of a piece-wise linear curve fitting process 300 performed by the gain versus time estimator 220 in the CPICH symbol correction unit 200 of FIG. 2. For example, FIG. 4 shows a gain correction curve with three linear segments of estimated gain shown.

Referring to FIG. 3, in step 305, the input symbols are partitioned into M groups of symbols. The size the groups may all be the same size but in general each group size L(m), m=1 . . . M, may have a different size. For each group m, step 310 defines two vectors. The vector Y is formed from the elements (i.e., symbols) in a current group of symbols, and the vector X is just the sequence of numbers from $-[L(m)-1]/2$ up to $[L(m)-1]/2$ in steps of one. In step 315, the variable A is calculated based on the average of Y. This is the average value of the best fit straight line through the symbols. In step 320, the variable B is calculated by dividing the vector inner-product of X and Y by the average of the square of the elements (i.e., symbols) in X, $B=(X^TY)/\text{average}(X^2)$. This is the slope of the best fit straight line through the symbols. In step 325, the best fit straight line, $C_m$, though the symbols in group m are computed. In step 330, m is compared to M to determine if all groups have to be accounted for. If m<M, m is incremented in step 335 and the process is repeated starting at step 310. If m=M, the set of $C_m$'s are concatenated in step 340 and output from the gain versus time estimator 220 as signal 245.

Figure 4:
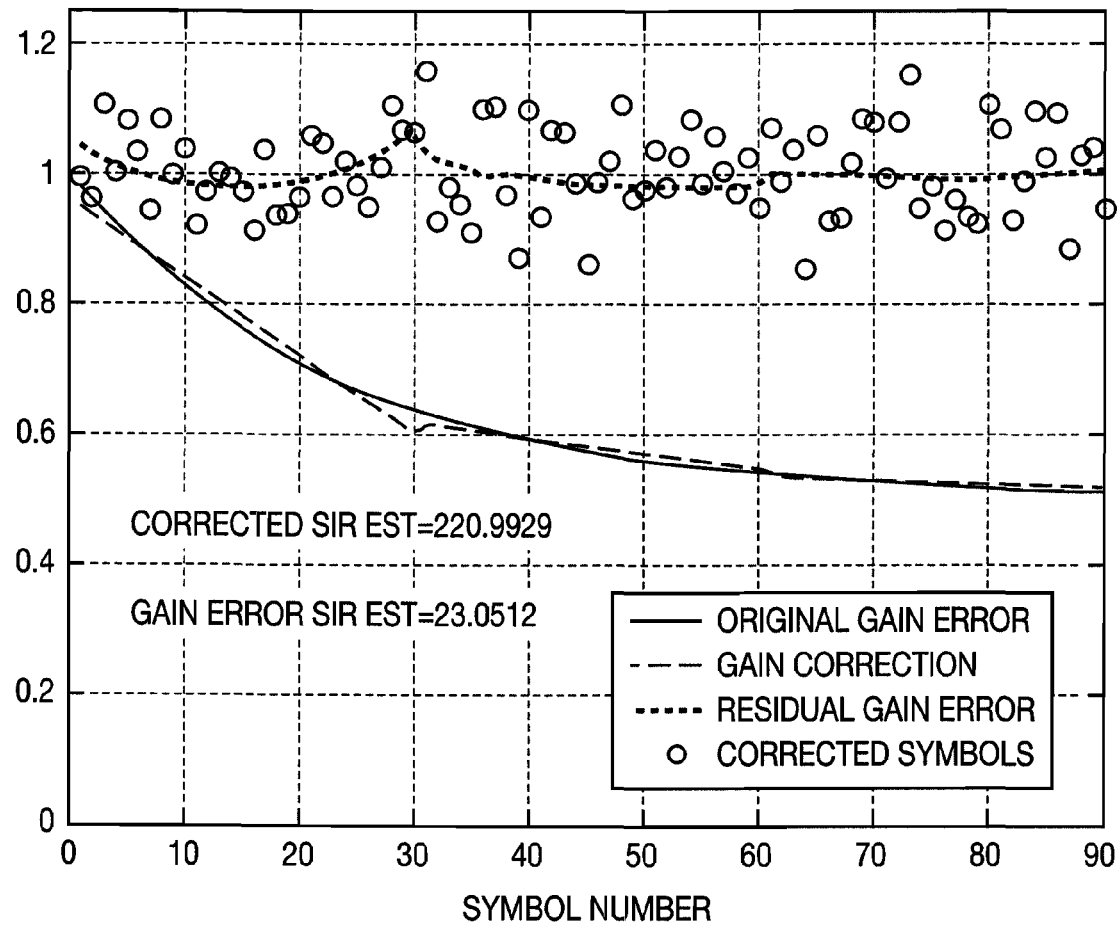
FIG. 4 shows gain correction of symbols as implemented by the apparatus of FIG. 2.

FIG. 4 shows the correction of symbols that have been subjected to a time varying gain using the apparatus 200 and process 300 illustrated in FIGS. 2 and 3, respectively. The solid line shows the original gain error (or equivalently the mean) of the input symbols. FIG. 1 also shows the original gain error of the input symbols and also the input symbols themselves shown as open circles.

Still referring to FIG. 4, the dashed line is the estimated time-varying mean of the input symbols generated by gain versus time estimator 220. Note that this curve is composed of 3 straight sections. The input symbols are divided by this curve to produce the corrected symbols shown as open circles in FIG. 4. Note the difference between the open circles in FIG. 4 and FIG. 1. The residual gain, or the effective gain after correction of the symbols, is shown as the dotted line in FIG. 4.

Figure 5:
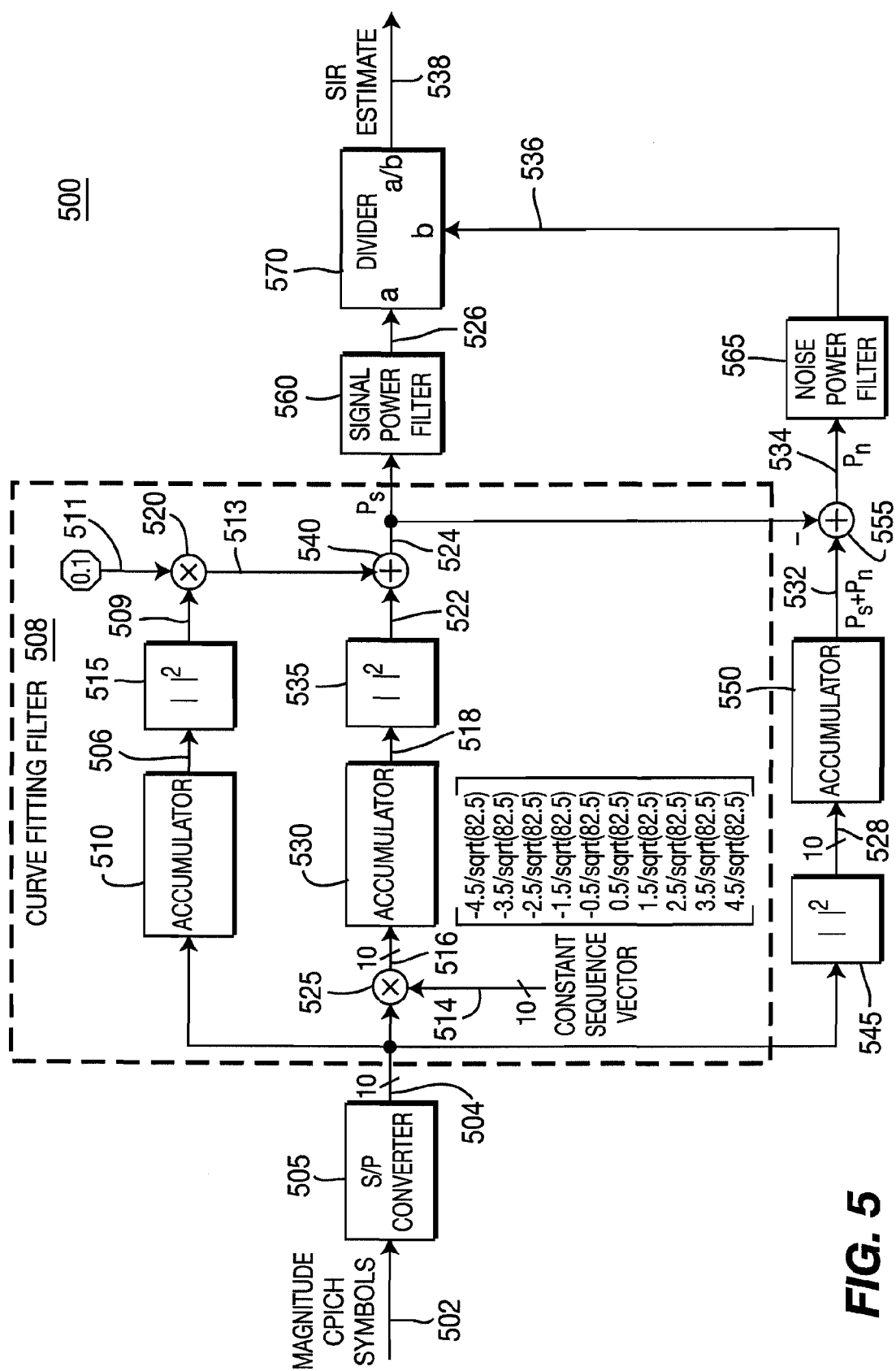
FIG. 5 is a block diagram of an exemplary apparatus for performing SIR estimates using a first order curve fitting procedure on groups of 10 symbols to implicitly correct symbols for SIR estimation in accordance with another embodiment of the present invention.

FIG. 5 is a block diagram of an exemplary apparatus 500 for performing SIR estimates using a first order curve fitting procedure on groups of 10 symbols to implicitly correct symbols for SIR estimation in accordance with another embodiment of the present invention. The apparatus 500 includes a serial-to-parallel (S/P) converter 505, a curve fitting filter 508, a magnitude squared unit 545, an accumulator 550, an adder 555, a signal power filter 560, a noise power filter 565 and a divider 570. The curve fitting filter 508 includes accumulators 510, 530, magnitude squared units 515, 535, a multiplier 520, an element-wise vector 525 and an adder 540.

In this example, a plurality of magnitude CPICH symbols 502 are grouped into a vector of ten (10) symbols 504 by an S/P converter 505. The symbol vector 504 is fed to the curve fitting filter 508 and the magnitude squared unit 545 such that the apparatus may simultaneously correct and compute SIR of the symbols. In the curve fitting filter 508, the accumulator 510 and the element-wise vector multiplier 525 receive the symbol vector 504.

The accumulator 510 adds all of the symbols in the symbol vector 504 to produce a sum 506 which is squared by the magnitude squared unit 515 to produce a magnitude squared sum 509, which is multiplied by a reference signal 511 having an amplitude equivalent to one divided by the number of symbols in the vector 504 (which is 0.1 for this example) by the multiplier 520 to produce a product signal 513.

The element-wise vector multiplier 525 multiplies the vector signal 504 by a constant sequence vector 514 to produce a vector signal 516. The elements (i.e., symbols) of the vector signal 516 are summed in the accumulator 530 to produce a sum 518 which is squared by the magnitude squared unit 535 to produce a magnitude squared sum 522 which is added to the product signal 513 by the adder 540 to produce a signal power ($P_s$) estimate 524.

The vector signal 504 is element-wise squared by the magnitude squared unit 545 to produce a vector signal 528, the elements (i.e., symbols) of which are summed by the accumulator 550 to produce a total power estimate 532. The signal power estimate 524 is subtracted from the total power estimate 532 by the adder 555 to produce a noise power ($P_n$) estimate 534.

The signal power estimate 524 is filtered by the signal power filter 560 to produce a filtered signal power estimate 526. The noise power estimate 534 is filtered by the noise power filter 565 to produce a filtered noise power estimate 536. The divider 570 computes the ratio of signal 526 and signal 536 to produce a SIR estimate 538 for symbols that have undergone a time varying gain.

In accordance with the present invention, a group of symbols is collected and used to compute the SIR. The group is partitioned into several smaller groups. Within each smaller group, an Nth order fit (N=0,1, . . .) is computed for the symbol amplitudes and each symbol is divided by the corresponding value computed by the fit. The SIR can then be computed in a standard way.

This present invention is advantageous when gain changes occur but generates a small positive bias when no actual gain change occurs. As such, the correction algorithm may optionally not be run if it can be determined that the power level is not changing substantially. The procedure is illustrated in FIG. 3 for first order fits (N=1). The pre- and post-gain corrected symbols and computed SIRs are shown in FIG. 1 and FIG. 4 respectively, using a partition into 3 groups and using 1st order fits (N=1).

In another embodiment of the invention, the invention makes use of apriori knowledge of both the time of the power level change and the characteristics of the AGC. In this case, the group is not partitioned. Instead, the size of the gain change is estimated (either by measurement of symbols or directly from gain control stage). Since the characteristics of the AGC are known, the gain as a function of time throughout the group of symbols is easily computed and used to divide the corresponding symbols' amplitudes. If the location of the power level change is not known apriori, it may also be estimated. The AGC characteristics can also be estimated if they are not known.

As an example, a linear (first-order) curve fitting approach is used for each group of CPICH symbols collected. Coefficients for the first-order curve fitting polynomial are attained by least squares, which minimize the sum of squared residuals, or $$\min \sum_{i=1}^{N} (y_i - \hat{y}_i)^2 \quad \text{Equation (1)}$$

where N is the number of observed CPICH symbols, yi is the received signal, and $$\hat{y}_i = b_0 + b_1 t_i \quad \text{Equation (2)}$$

is the estimated value with $t_i$ as the reference sequence for curve fitting.

The coefficient b0 and b1 are easily found taking the partial derivative of Equation (1) and setting it to zero. The first-order solutions of b0 and b1 are $$b_0 = \bar{y} - b_1 \bar{t} \quad \text{Equation (3)}$$

$$b_1 = \frac{\sum_{i=1}^{N} y_i t_i - N \bar{y} \bar{t}}{\sum_{i=1}^{N} t_i^2 - N \bar{t}} \quad \text{Equation (4)}$$

where $$\bar{y} = \frac{1}{N} \sum_{i=1}^{N} y_i$$

and $$\bar{t} = \frac{1}{N} \sum_{i=1}^{N} t_i.$$

A zero-mean sequence is used so that, $\bar{t}=0$, which simplifies the above equations. Also note that $$\frac{1}{\sum_{i=1}^{N} t_i^2}$$

is a constant and can be replaced with a constant gain K.

$$b_0 = \frac{1}{N} \sum_{i=1}^{N} y_i \quad \text{Equation (5)}$$

$$b_1 = \frac{1}{K} \sum_{i=1}^{N} y_i t_i \quad \text{Equation (6)}$$

With the available curve fitting coefficients, the following equations may be used to define the estimates of signal power and noise power and thus the SIR estimate. The power of the CPICH magnitude is preferably estimated by $$P_s \approx \sum_{i=1}^{N} (b_0 + b_1 t_i)^2 \quad \text{Equation (7)}$$
$$= \sum_{i=1}^{N} b_0^2 + \sum_{i=1}^{N} b_1^2 t_i^2$$
$$= N b_0^2 + b_1^2 K$$

where $b_0$ and $b_1$ are obtained by passing the CPICH magnitude ($M_i$) through the curve fitting filter. Substituting $b_0$ and $b_1$ into the above equation leads to $$P_s = \frac{1}{N} \left( \sum_{i=1}^{N} M_i \right)^2 + \frac{1}{K} \left( \sum_{i=1}^{N} M_i t_i \right)^2 \quad \text{Equation (8)}$$

The power of the CPICH signal-plus-noise magnitude is $$P_s + P_n = \sum_{i=1}^{N} M_i^2 \quad \text{Equation (9)}$$

Therefore, the CPICH magnitude SIR is preferably given by $$SIR = \frac{P_s}{P_n} = \frac{P_s}{\sum_{i=1}^{N} M_i^2 - P_s} \qquad \text{Equation (10)}$$

As shown in FIG. 5, optional filtering of the numerator and denominator is implemented to decrease the variance of the SIR estimate. The number of observed symbols N is chosen to be 10. The constant zero-mean reference sequence for curve fitting is chosen to be $t=[-4.5, -3.5, -2.5, -1.5, -0.5, 0.5, 1.5, 2.5, 3.5, 4.5]^T$. In this case, K=82.5 can be combined with t. Thus the constant sequence vector becomes $t/\sqrt{82.5}$ as shown.

Although the embodiments are described in the context of a 3G HSDPA system, the invention applies generally to any packet based system such as IEEE 802 standard. Although the features and elements of the present invention are described in the preferred embodiments in particular combinations, each feature or element can be used alone without the other features and elements of the preferred embodiments or in various combinations with or without other features and elements of the present invention.

What is claimed is:

1. A method for generating a signal to interference ratio estimate in wireless communications, comprising:
    collecting common pilot channel (CPICH) symbols and associated symbol amplitudes;
    estimating gain variations based on a time history of the CPICH symbol amplitudes;
    generating an estimated gain history by relating gain to a time estimate; and
    correcting corresponding symbols and associated symbol amplitudes based on the estimated gain history.

2. The method of claim 1, wherein the CPICH symbols are despread CPICH symbols.

3. The method of claim 1, wherein the CPICH symbols are any other type of phase modulated symbols.

4. The method of claim 1, wherein each CPICH symbol is a complex number.

5. The method of claim 1, further comprising:
    generating a magnitude signal equal to the magnitude of the CPICH symbols.

6. A symbol correction unit configured to collect common pilot channel (CPICH) symbols and associated symbol amplitudes, comprising:
    a gain versus time estimator configured to:
        estimate gain variations based on a time history of the CPICH symbol amplitudes; and
        generate an estimated gain history by relating gain to a time estimate; and
    a divider configured to correct corresponding symbols and associated symbol amplitudes based on the estimated gain history.

7. The symbol correction unit of claim 6, further comprising:
    a magnitude unit configured to generate a magnitude signal equal to the magnitude of the CPICH symbols.

8. The symbol correction unit of claim 6, wherein the CPICH symbols are despread CPICH symbols.

9. The symbol correction unit of claim 6, wherein the CPICH symbols are any other type of phase modulated symbols.

10. The symbol correction unit of claim 6, wherein each CPICH symbol is a complex number.

* * * * *